Figure 1:
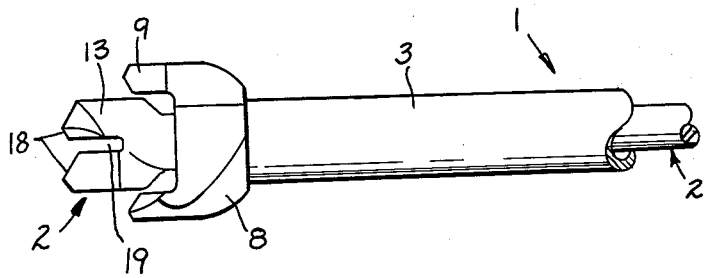

Sept. 24, 1963  I. G. GULLEY  3,104,563
DRILLS
Filed Oct. 19, 1961

INVENTOR:
IRVIN GLEN GULLEY
BY
John D. Wilkins
ATTORNEY 3,104,563
DRILLS
Irvin Glen Gulley, London, England, assignor to Olin Mathieson Chemical Corporation, a corporation of Virginia
Filed Oct. 19, 1961, Ser. No. 146,304
3 Claims. (Cl. 77—65)

The invention relates to drilling tools and has particular reference to portable drilling tools, although it is not restricted thereto.

It is well known that during the operation of a conventional drilling tool, a twisting force is transmitted from the drill. Consequently, the operator who is holding the drilling tool or a fixed mounting supporting the drilling tool must exert a counter torque for withstanding such twist. The invention aims to reduce or eliminate such counter torque. The invention is particularly applicable to manually-held drilling tools with a view to permitting the operator to use most or all of his energy to exert axial force on the drill.

According to the invention, the drilling tool comprises two coaxial counter-rotatable drills. It will be evident that by means of the invention, the twists imparted by the two drills are in opposite senses so that the counter torque required to be exerted is equal to only the numerical difference (if any) between the two twists.

Figure 2:
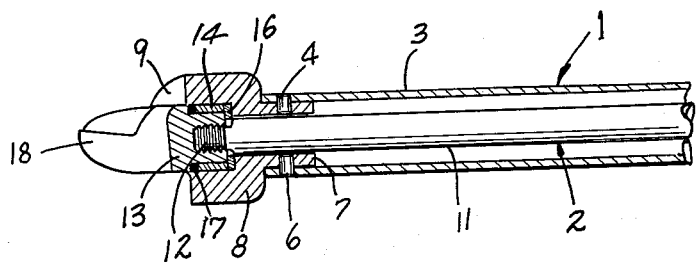

An example of the invention is illustrated in the drawing accompanying the specification, wherein:

FIGURE 1 is a fragmentary side elevation of a drilling tool according to the invention in the process of drilling a hole, and FIGURE 2 is a fragmentary sectional side elevation of the drilling tool of FIGURE 1.

According to the invention, the drilling tool comprises two counter-rotatable drills 1 and 2. In the illustrated example, the outer drill 1 comprises a tubular shank 3 adapted to be pinned at 4 and 6 to the spigot 7 of a fluted hollow drilling head 8 which is fitted with a carbide cutting tip 9. The inner drill 2 comprises a shank 11 which extends freely within the shank 3 and which passes with clearance through the spigot 7 and cutting head 8 of the drill 1. The shank 11 terminates in a screwthreaded spigot 12 engaging a fluted cutting head 13 which may also be carbide tipped at 18 and which projects from the cutting head 8. A portion of the cutting head 8 having a reduced diameter forming a recess which provides a cup for the accommodation of the cutting head 13. To provide a suitable bearing surface between the oppositely rotating cutting heads, there is also included a two-part bearing comprising a cylindrical bush 14 and a washer 16.

A diametrical chip clearance groove 19 (see FIG. 1) is provided across the working end of the inner drill head 13 and may extend substantially to the end of the outer drill head 8.

The two shanks 3 and 11 are driven in opposite directions from a gear box (not shown) which is preferably combined in one unit with an electric motor, the unit being designed so that it can be readily held by an operator.

The range of drill speeds contemplated is 200–900 r.p.m. for the drill 1 and 250–800 r.p.m. for the drill 2, but their exact absolute speeds, and consequently their relative speeds, should be determined experimentally depending on the material to be drilled and the required size of the hole.

It will be clear that although the invention has only been described with reference to two drills, three or more coaxial drills may be used.

In a preferred embodiment, sealing means 17 (shown in FIG. 1) are provided to prevent the ingress of cuttings and dirt to the bearing surfaces between the two cutting heads.

What is claimed is:

1. A drilling tool comprising at least two coaxially mounted oppositely rotatable drill shanks, one an outer tubular member and the other an inner member, a separate inner drill head having a rear end portion mounted on the end of said inner member by a connection, an outer drill having a hollow spigot carried in the end of the outer member to fix said outer drill to said outer member and having opposite said spigot a drill head with cutting edges forming an enlargement extending outwardly and forwardly of said outer member end, said outer drill head having a recess opposite said spigot within said cutting edges, said recess having an open end and apertured bottom for respectively receiving said rear end portion rotatably through said open end and receiving said inner member end extending rotatably through said outer drill spigot and bottom into said recess, a substantially uninterrupted circumferential bearing in said recess between said heads, said bearing formed by a washer between said rear end portion and said bottom and a cylindrical bushing about said rear end portion, said recessed head forming a cup for seating said inner head end bearing, and sealing means to prevent ingress of cuttings and dirt to said bearing.

2. A tool according to claim 1 wherein the connection is formed by the inner drill shank and head seated in the outer drill being provided respectively with a screwthreaded spigot and with a screwthreaded recess into which is screwed said screwthreaded spigot on said inner drill shank passing through said outer drill.

3. A tool according to claim 2 wherein the inner drill head has a diametrical chip clearance groove extending across its working end substantially to the outer drill head.

References Cited in the file of this patent
UNITED STATES PATENTS

| | | |
|---|---|---|
| 1,723,999 | Bernard | Aug. 13, 1929 |
| 1,940,220 | McGrath | Dec. 19, 1933 |
| 2,027,385 | Kraut et al. | Jan. 14, 1936 |
| 2,345,403 | McGrew | Mar. 28, 1944 |